United States Patent
Picron et al.

(10) Patent No.: US 10,640,099 B2
(45) Date of Patent: May 5, 2020

(54) DRIVING ASSISTANCE DEVICE AND METHOD

(71) Applicant: VALEO Schalter und Sensoren GmbH, Bietigheim-Bissingen (DE)

(72) Inventors: Vanessa Picron, Créteil (FR); Benazouz Bradai, Créteil (FR); Thomas Heitzmann, Créteil (FR); Damien Fournigault, Créteil (FR); Didier Taccoen, Créteil (FR); Pascal Maurel, Créteil (FR); Frédéric Cousin, Créteil (FR); Roland Randriazanamparany, Créteil (FR); Lucian Vatamanu, Créteil (FR)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 169 days.

(21) Appl. No.: 15/782,020

(22) PCT Filed: Dec. 6, 2016

(86) PCT No.: PCT/EP2016/079959
§ 371 (c)(1),
(2) Date: Jun. 6, 2018

(87) PCT Pub. No.: WO2017/097786
PCT Pub. Date: Jun. 15, 2017

(65) Prior Publication Data
US 2018/0362011 A1    Dec. 20, 2018

(30) Foreign Application Priority Data
Dec. 7, 2015  (FR) ...................... 1561943

(51) Int. Cl.
*B60W 10/18* (2012.01)
*B60W 10/02* (2006.01)
(Continued)

(52) U.S. Cl.
CPC ............ *B60W 10/02* (2013.01); *B60W 10/04* (2013.01); *B60W 10/18* (2013.01); *B60W 10/20* (2013.01);
(Continued)

(58) Field of Classification Search
CPC ...... B60W 10/02; B60W 10/04; B60W 10/18; B60W 10/20; B60W 30/18063; F16D 48/08; G06K 9/00791; G06K 9/6288
(Continued)

(56) References Cited

U.S. PATENT DOCUMENTS 9,373,149 B2 * 6/2016 Abhyanker ............ G06Q 50/28
9,612,123 B1 * 4/2017 Levinson ............... G01C 21/32
(Continued)

FOREIGN PATENT DOCUMENTS

DE    198 18 809 A1    12/1998
DE    102 21 835 A1    12/2003
(Continued)

OTHER PUBLICATIONS

Kolb, A. et al.; "Time-of-Flight Sensors in Computer Graphics"; Eurographics State of the Arts Report, Mar. 30, 2009; pp. 119-134 (17 pages).
(Continued)

*Primary Examiner* — Thomas G Black
*Assistant Examiner* — Wae L Louie
(74) *Attorney, Agent, or Firm* — Osha Liang LLP (57) ABSTRACT

The invention relates to a driving assistance device for a motor vehicle comprising:
- a camera (9) capable of generating a first map of the environment of the motor vehicle (8);
- a transit time sensor (12) capable of generating a second map of the vehicle environment (8);
- a driving assistance module comprising:
  - a fusion unit capable of generating a precise map of the frontal environment of the vehicle, the precise map being generated by the fusion unit as a function of the first map and the second map;

(Continued)

a movement computation unit capable of generating an acceleration setpoint of the vehicle as a function of the precise map of the vehicle environment.

13 Claims, 7 Drawing Sheets

(51) Int. Cl.

| | | |
|---|---|---|
| *B60W 10/04* | (2006.01) | |
| *B60W 10/20* | (2006.01) | |
| *B60W 30/16* | (2020.01) | |
| *B60W 30/18* | (2012.01) | |
| *F16D 48/06* | (2006.01) | |
| *G06K 9/00* | (2006.01) | |
| *G06K 9/62* | (2006.01) | |

(52) U.S. Cl.
CPC ...... *B60W 30/16* (2013.01); *B60W 30/18063* (2013.01); *F16D 48/06* (2013.01); *G06K 9/00791* (2013.01); *G06K 9/6288* (2013.01); *B60W 2710/027* (2013.01); *B60W 2710/0644* (2013.01); *B60W 2750/308* (2013.01); *F16D 2500/30401* (2013.01); *F16D 2500/30406* (2013.01); *F16D 2500/30806* (2013.01); *F16D 2500/30814* (2013.01); *F16D 2500/3108* (2013.01); *F16D 2500/3124* (2013.01); *F16D 2500/3125* (2013.01); *F16D 2500/3127* (2013.01); *F16D 2500/3144* (2013.01); *F16D 2500/31413* (2013.01)

(58) Field of Classification Search
USPC ........................................................ 701/96
See application file for complete search history.

(56) References Cited

U.S. PATENT DOCUMENTS

| | | | |
|---|---|---|---|
| 2010/0228419 | A1 | 9/2010 | Lee et al. |
| 2011/0102592 | A1* | 5/2011 | Bradai ................ H04N 17/002 348/148 |
| 2014/0236441 | A1* | 8/2014 | Sato ........................ B60K 23/00 701/64 |
| 2015/0096863 | A1* | 4/2015 | Maurel ..................... H02P 6/08 192/84.1 |
| 2015/0307157 | A1* | 10/2015 | Gao ........................ B62M 9/122 701/52 |
| 2017/0113664 | A1* | 4/2017 | Nix ..................... G06F 11/3072 |
| 2017/0261995 | A1* | 9/2017 | Heimberger .......... B60W 40/04 |
| 2018/0376357 | A1* | 12/2018 | Tavares Coutinho .. H04L 67/32 |
| 2019/0308617 | A1* | 10/2019 | Groult ..................... B60Q 1/46 |

FOREIGN PATENT DOCUMENTS

| | | |
|---|---|---|
| DE | 10 2013 021 441 A1 | 7/2014 |
| EP | 1 914 435 A1 | 4/2008 |

OTHER PUBLICATIONS

Foix, S. et al.; "Lock-in Time-of-Flight (ToF) Cameras: A Survey"; IEEE Sensors Journal, vol. 11, No. 9, Sep. 1, 2011; pp. 1917-1926 (10 pages).

Aycard, O. et al.; "Intersection Safety using Lidar and Stereo Vision sensors"; 2011 IEEE, Intelligent Vehicles Symposium (IV), Jun. 5, 2011; pp. 863-869 (7 pages).

International Search Report issued in PCT/EP2016/079959 dated Jul. 17, 2017 (10 pages).

Written Opinion issued in PCT/EP2016/079959 dated Jul. 17, 2017 (10 pages).

\* cited by examiner

DRIVING ASSISTANCE DEVICE AND METHOD

TECHNICAL FIELD

The invention relates to the field of motor vehicles and, more specifically, to vehicles comprising a driving assistance system.

TECHNOLOGICAL BACKGROUND

In the prior art, vehicles are known that comprise one or more assisted driving systems for given situations. For example, vehicles exist that integrate a park assist system or a system for setting the speed to a setpoint value defined by the driver. Such systems are adapted to very specific situations such as, for example, during a parallel parking maneuver or when driving at high speed on a fast lane. Each driving assistance system is thus intended to manage a given driving situation.

Vehicles integrating driving assistance systems comprise a plurality of sensors that allow the environmental conditions of the vehicle to be determined. Depending on these environmental conditions, the driving assistance systems use actuators in order to control the various elements of the vehicle and to drive the vehicle without intervention from the driver.

However, a driving assistance system does not currently exist for all driving situations. Certain particularly tiring driving conditions thus currently remain the responsibility of the driver. Thus, for example, a driving assistance system for heavy traffic does not currently exist on vehicles with manual gearboxes.

Thus, for heavy traffic, the vehicle generally must alternate between stationary phases and driving phases. Therefore, the driver must remain particularly attentive in order to continuously anticipate these changes in phase that are associated with the variations in distance to the vehicles ahead of them on the road. This need for attention is further intensified within the context of a road having a plurality of traffic lanes in order to also anticipate the traffic lane changes of other vehicles. This need for constant attention is tiresome for the driver.

Furthermore, alternating from a stationary phase to a driving phase subjects the vehicle to acceleration phases and to deceleration phases. Therefore, the driver continually has to alternate between the use of the acceleration pedal and the use of the brake pedal, generating additional fatigue. This fatigue is further intensified in the case of a manual gearbox since the clutch pedal also needs to be controlled during these acceleration and deceleration phases.

Therefore, a requirement exists for driving assistance for heavy traffic situations.

SUMMARY

The aim of the invention is to overcome this requirement by providing a driving assistance method within the context of heavy traffic. The invention also aims to overcome this problem by providing a driving assistance device for assisting a driver in a heavy traffic situation.

To this end, according to a first aim, the invention provides a driving assistance method for a vehicle for tracking a target such as, for example, a target vehicle circulating upstream in the flow of traffic, the vehicle comprising a clutch mounted between an engine output shaft and an input shaft of a manual gearbox of the vehicle, the driving assistance method comprising, on a recurring basis, the following steps:
 detecting a condition for entering the driving assistance method, the entry condition comprising a gearbox ratio condition, the gearbox ratio condition being met when the gearbox ratio is equal to a predetermined gearbox ratio selected from the first gear ratio and the second gear ratio of the gearbox and/or an activation of the function by the driver by means of the human-machine interface;
 providing an acceleration setpoint as a function of driving conditions, the driving conditions comprising a distance to a target as a function of time, this setpoint being positive or negative. In the case of a negative setpoint that cannot be produced by the engine, the method can further comprise a step of controlling the braking system for applying this setpoint;
 computing a vehicle speed setpoint as a function of the acceleration setpoint and a current speed of the vehicle;
 computing a vehicle dynamics management torque setpoint, for example, a wheel torque, as a function of the vehicle speed setpoint, the current speed of the vehicle and a current torque of the powertrain, for example, the current wheel torque;
 computing a gearbox input torque setpoint as a function of the engaged gearbox ratio and of the vehicle dynamics management torque setpoint;
 regulating the engine speed as a function of the gearbox input torque setpoint;
 computing a clutch torque setpoint as a function of the gearbox input torque setpoint and of the clutch status;
 regulating a physical quantity controlling the torque that can be transferred by the clutch as a function of the clutch torque setpoint. This physical quantity being able to be a position of the pressure plates, the stop, the fork, the position of an element for actuating the fork, the rotation of an electric motor of an actuator, the force applied to the clutch control, a hydraulic pressure in the clutch control, a current in the electric motor, a voltage applied to an electric motor, a flow in a hydraulic clutch control solenoid valve, a control current of a hydraulic clutch control solenoid valve, a voltage applied to this solenoid valve, an estimate of the torque that can be transferred by the clutch deduced from information relating to the control of the clutch according to one or more predetermined items of information and/or of information relating to the drive chain of the vehicle, such as the engine speeds, the input and output box, the vehicle, the engine torque.

Such a clutch management method allows the vehicle speed to be controlled as a function of measured environmental data. In particular, such a driving assistance method allows, as a function of measured acceleration data, the engine speed to be regulated and the torque that can be transferred by the clutch to be controlled in order to obtain a vehicle dynamics management torque that corresponds to the current environmental situation. Furthermore, controlling the clutch allows the driver to comfortably control the moving off and stopping situations of the vehicle. Moreover, controlling the engine speed allows the vehicle speed to be controlled when the clutch is engaged. Thus, when the clutch torque setpoint is below the maximum torque that can be transferred by the clutch at the engine idling speed, controlling the movement of the vehicle is effected by applying a constant engine speed and by regulating the physical quantity controlling the clutch torque so that the clutch transfers the torque that is required to obtain the clutch torque setpoint. In addition, when the clutch torque setpoint is greater than the maximum torque that can be transferred by the clutch at the engine idling speed, the movement of the vehicle is controlled by synchronizing the drive shaft and the gearbox input shaft via an engagement of the clutch at a constant engine speed, then by controlling the engine speed whilst keeping the clutch engaged in order to achieve the clutch torque setpoint.

According to other advantageous embodiments, such a driving assistance method can have one or more of the following features:

the driving assistance method further comprises the following steps:
  detecting traffic jam type traffic conditions and relaying information relating to this detection to the driver;
  detecting a target to be tracked;
  notifying the driver of the availability of the assistance function as a function of the traffic conditions, the distance to the target, the driving status of the vehicle and the status of the transmission (for example, gear engaged or gear to be engaged to make the assistance function available), the state of the road surface, visible and detectable road markings;
  suspending target tracking in the event of a momentary action by the driver on the driving interface, the steering wheel, the accelerator pedal, the gear lever, the brake pedal and/or the clutch pedal;
  resuming target tracking if the action of the driver is no longer present and remains within a given acceptable variation range;
  notifying the driver of deactivation if the conditions prior to the implementation of the driving assistance function are no longer present;
  deactivating the assistance function if the driver significantly and/or effectively regains control of the vehicle;
the step of regulating a physical quantity controlling the torque that can be transferred by the clutch comprises a step of applying temporal filtering of the clutch torque setpoint in order to regulate a physical quantity controlling the torque that can be transferred by the clutch according to a progressive movement ramp. Such a step of applying filtering of the clutch torque setpoint allows declutching or progressive engagement of the clutch, thus avoiding jerked transfer of the torque on the clutch that can cause an oscillation of the entire powertrain and of the transmission that is detrimental to driving comfort;
the step of regulating a physical quantity controlling the torque that can be transferred by the clutch comprises:
  moving the clutch to a fully declutched position in response to a zero clutch torque setpoint;
  moving the clutch to a slippage position in response to a clutch torque setpoint that is positive and is less than the maximum torque that can be transferred by the clutch at the engine idling speed, said slippage position being necessary to ensure driving at a vehicle speed that will be less than the vehicle speed at the idling speed with a clutch in a maximum transferable torque position;
  moving the clutch to a maximum transferable torque position when the input speeds, engine speed, output speed and gearbox speed are equal and the torque requirement is equal to the maximum transferable torque;
  keeping the clutch in a maximum transferable torque position increased by a closure threshold if the vehicle speed setpoint is greater than the vehicle speed at the idling speed for the engaged gearbox ratio.

Such a step of regulating a physical quantity controlling the torque that can be transferred by the clutch allows a vehicle dynamics management torque to be provided that corresponds to the requested acceleration setpoint. In particular, this regulation step allows the vehicle to run at a constant speed below the idling speed. Idling speed is understood to be the speed of the vehicle when the engine is idling and the clutch is in the maximum transferable torque position. Thus, such a regulation step allows a vehicle dynamics management torque to be obtained during a heavy traffic situation requiring a reduced vehicle speed that is below the idling speed.

The driving assistance method further comprises:
  detecting a condition for exiting the driving assistance method, the exit condition comprising a condition for activating a pedal of the vehicle, the condition for activating a pedal of the vehicle being met when a user presses on either the vehicle acceleration pedal or the vehicle clutch pedal. In some embodiments, the exit condition also can comprise cumulative or alternative conditions relating to the activation of a brake pedal, the gear lever and/or the steering wheel;
  terminating the driving assistance method when the exit condition is met. In an improvement, the step of terminating the process requires confirmation of the driver regaining control of the vehicle through an action or prolonged presence on the vehicle control elements.

The driving assistance method further comprises:
  detecting a reduction in the engine speed and/or a reduction in the gearbox speed that is greater than a predetermined anti-stalling threshold;
  moving the clutch to a fully declutched position according to a profile determined as a function of the engine speed and of the deceleration of the vehicle;
  this step of detecting a reduction in the engine speed and/or the gearbox speed advantageously prevents the vehicle from stalling or causing uncomfortable jerking for the driver during emergency braking;
the step of computing the vehicle speed setpoint further comprises:
  setting the vehicle speed setpoint to the current speed of the vehicle incremented by a predetermined speed value in response to a positive acceleration setpoint and a current speed of the vehicle that is less than the maximum speed of the vehicle for the engaged gearbox ratio; and
  setting the vehicle speed setpoint to the current speed of the vehicle decremented by the predetermined speed value in response to a negative acceleration setpoint;
the step of computing the vehicle speed setpoint further comprises:
  setting the vehicle speed setpoint to the current speed of the vehicle in response to a zero acceleration setpoint and/or to a current speed of the vehicle that is greater than or equal to the maximum speed of the vehicle for the engaged gearbox ratio;
the step of computing the vehicle dynamics management torque setpoint comprises:
  computing a vehicle speed differential between the vehicle speed setpoint and the current speed of the vehicle;

setting the vehicle dynamics management torque setpoint to the current torque of the wheels incremented by a predetermined torque value in response to a vehicle speed differential that is greater than a first threshold;

setting the vehicle dynamics management torque setpoint to the current torque of the wheels decremented by the predetermined torque value in response to a vehicle speed differential that is greater than a second threshold;

setting the vehicle dynamics management torque setpoint to the current torque of the wheels in response to a vehicle speed differential between the first threshold and the second threshold;

the step of computing a gearbox input torque setpoint further comprises:

providing a map of the gearbox input torque as a function of a wheel torque for a given gearbox ratio;

determining the gearbox input torque setpoint as a function of the map of the gearbox input torque;

the step of moving the clutch to a declutched position in response to a zero clutch torque setpoint comprises, on a recurring basis, the following steps:

controlling the clutch status; and moving the clutch to a declutched position in response to a non-fully open clutch status, according to a given declutching profile;

the step of moving the clutch to a maximum transferable torque position in response to a torque setpoint that is greater than the idling clutch torque comprises, on a recurring basis, the following steps:

comparing the gearbox speed and the engine speed; and moving the clutch to the maximum transferable torque position in response to the detection of an engine speed that is distinct from the gearbox speed.

The driving assistance method further comprises:

providing a road grade, the predetermined gearbox ratio being the second gear ratio in response to a negative or zero road grade and the first gear ratio in response to a positive road grade. In one embodiment, the predetermined gearbox ratio is the second gear ratio in response to a road grade that is negative or below a threshold, for example, between 0% and 2%, and the first gear ratio in response to a road grade that is greater than said threshold.

In one embodiment, when heavy traffic conditions are detected, the human-machine interface transmits a signal for the attention of the driver in order to notify them of the possibility of activating the driving assistance method by engaging a predetermined ratio, for example, the first gear ratio of the gearbox or the second gear ratio of the gearbox.

Some aspects of the first aim of the invention are based on the concept of providing a driving assistance device for a heavy traffic situation. Some aspects of the first aim of the invention are based on the concept of providing a driving assistance system capable of autonomously controlling the vehicle in the event of heavy traffic. Some aspects of the first aim of the invention are based on the concept of providing a simple driving assistance system in the event of heavy traffic.

Some aspects of the first aim of the invention are based on the concept of controlling an engine and a clutch as a function of acceleration data in the event of heavy traffic. Some aspects of the first aim of the invention are based on the concept of providing clutch control that is capable of managing a vehicle speed setpoint below the idling speed for a given gearbox ratio. Some aspects of the first aim of the invention are based on the concept of providing a driving assistance method that is capable of managing speed variations of the vehicle.

Furthermore, in order to be able to provide reliable driving assistance services, a requirement exists for systems that are capable of monitoring the environment of the motor vehicle and that have equipment costs that are as economical as possible.

To this end, according to a second aim, the invention provides a driving assistance device for a motor vehicle comprising:

a camera capable of generating a first map of the environment of the motor vehicle in a first frontal environment area of the vehicle between a first minimum distance and a first maximum distance;

a transit time sensor capable of generating a second map of the vehicle environment in a second frontal environment area of the vehicle between a second minimum distance below the first minimum distance and a second maximum distance between the first minimum distance and the first maximum distance so that the first environment area of the vehicle and the second environment area of the vehicle comprise a common environment area of the vehicle;

a driving assistance module comprising:

a fusion unit capable of generating a precise map of the vehicle environment in a third frontal environment area of the vehicle, the precise map being generated by the fusion unit as a function of the first map and the second map, the third frontal environment area of the vehicle comprising the intersection of the first frontal environment area of the vehicle and the second frontal environment area of the vehicle;

a movement computation unit capable of generating an acceleration setpoint of the vehicle as a function of the precise map of the vehicle environment.

Such a driving assistance device advantageously uses the capabilities of the various sensors in order to generate a precise map of the vehicle environment by combining the data relating to the vehicle environment obtained by various environment detection components. Analyzing this precise map over an extended area thus allows the movements of close vehicles to be determined in the event of heavy traffic and thus allows an acceleration setpoint to be generated for the vehicle as a consequence. Furthermore, this driving assistance device allows sensors to be used that are adapted to the environment area of the vehicle to be processed. In this case, for a heavy traffic situation, the vehicle environment to be analyzed in order to compute the acceleration setpoint must extend from an area very close to the vehicle to a limited range, for example, of approximately forty meters. Such sensors thus can be simple and inexpensive, as is the case for a transit time sensor.

According to other advantageous embodiments, such a driving assistance method can have one or more of the following features:

the device further comprises an ultrasound sensor capable of generating a third map of the vehicle environment in a fourth environment area of the vehicle between a third minimum distance below the second minimum distance and a third maximum distance between the second minimum distance and the first maximum distance;

the fusion unit of the driving assistance module is capable of generating the precise map of the frontal environment of the vehicle on the basis of the first, second and third maps, the third environment area of the vehicle comprising the intersection of the first, second and fourth frontal environment areas of the vehicle;

the driving assistance module comprises a targeting module capable of selecting a target to be tracked from among a set of obstacles of the vehicle environment identified by the precise map;

the movement computation unit is capable of computing a distance separating the vehicle from the selected target;

the movement computation unit is capable of generating the acceleration setpoint of the vehicle as a function of the distance separating the vehicle from the selected target;

the movement computation unit is capable of computing a speed and an acceleration of the selected target. This computation of the speed and the acceleration of the selected target can be completed in numerous ways. In one embodiment, the movement computation unit is capable of computing a speed and an acceleration of the selected target by deducing the distance between the vehicle and the selected target. By way of a variation, the speed and the acceleration of the selected target can be computed by Kalman filtering with a constant speed type model that allows the speed to be observed in relation to the position, for example;

the movement computation unit is capable of computing the acceleration setpoint of the vehicle as a function of the acceleration of the selected target;

the transit time sensor can be produced in numerous ways. Thus, the transit time sensor can be a laser sensor, for example, operating in the infrared range, for example;

the fusion unit is capable of combining together one of the objects identified by the first map and a corresponding object from the objects identified by the second map and of determining a position in the precise map of an object corresponding to said combined objects of the first map and the second map;

the fusion unit is capable of generating a precise map of the vehicle environment identifying a set of mobile objects and a road marking of the vehicle environment;

the movement computation unit is capable of generating a lateral movement setpoint as a function of the road marking identified by the precise map. In one embodiment, the movement computation unit is capable of generating a lateral movement setpoint as a function of the road marking identified by the precise map and/or virtual markings generated on the basis of the interpretation of the vehicle environment, for example, by perceiving fixed elements such as barriers, traces of vehicles, roadmap information (curvature radius, number of lanes, etc.) or other elements;

the driving assistance device further comprises a gearbox ratio sensor;

the driving assistance module is capable of detecting a condition for entering a driving assistance method, the entry condition comprising a gearbox ratio condition, the gearbox ratio condition being met when the gearbox ratio is equal to a predetermined gearbox ratio selected from the first gear ratio and the second gear ratio of the gearbox;

the vehicle further comprises an engine control unit capable of:

computing a vehicle speed setpoint as a function of the acceleration setpoint and a current speed of the vehicle;

computing a vehicle dynamics management torque setpoint as a function of the vehicle speed setpoint, the current speed of the vehicle and a current torque of the powertrain;

computing a gearbox input torque setpoint as a function of the engaged gearbox ratio and of the vehicle dynamics management torque setpoint;

regulating the engine speed as a function of the gearbox input torque setpoint; and computing a clutch torque setpoint as a function of the gearbox input torque setpoint and of the clutch status;

the vehicle further comprises a clutch control unit capable of regulating a physical quantity controlling the torque that can be transferred by the clutch as a function of the clutch torque setpoint;

the driving assistance device further comprises a human-machine interface;

the human-machine interface comprises a driver information means configured to transmit a signal for detecting conditions for entering the driving assistance method, the condition for entering the driving assistance method further comprising the activation of an activation unit by the driver;

the driving assistance device further comprises a road grade sensor;

the driving assistance module is configured to determine a road grade, the predetermined gearbox ratio being the second gear ratio in response to a negative or zero road grade and the first gear ratio in response to a positive road grade;

the driving assistance device further comprises a vehicle pedal activation sensor;

the driving assistance module is further configured to:

detect a condition (35) for exiting the driving assistance method, the exit condition comprising a condition for activating a pedal of the vehicle, the condition for activating a pedal of the vehicle being met when a user presses on either the vehicle acceleration pedal or the vehicle clutch pedal;

terminate the driving assistance method when the exit condition is met.

The invention also provides a driving assistance method for a motor vehicle for a heavy traffic situation comprising:

providing a first map of the vehicle environment in a first environment area of the vehicle between a first minimum distance and a first maximum distance;

providing a second map of the vehicle environment in a second environment area of the vehicle between a second minimum distance of the vehicle below the first minimum distance and a second maximum distance between the first minimum distance and the first maximum distance;

generating a precise map of the vehicle environment as a function of the first map and the second map;

computing an acceleration setpoint as a function of the precise map of the vehicle environment;

sending the computed acceleration setpoint to an engine control unit.

According to one embodiment, the aforementioned driving assistance method further comprises:

detecting a condition for entering a driving assistance method, the entry condition comprising a gearbox ratio condition, the gearbox ratio condition being met when the gearbox ratio is equal to a predetermined gearbox ratio selected from the first gear ratio and the second gear ratio of the gearbox;

transmitting a signal that indicates the possibility of activating the assisted driving;

the steps of computing an acceleration setpoint and of sending the acceleration setpoint are performed in response to the detection of the activation of a means for activating the assisted driving.

Some aspects of the second aim of the invention are based on the concept of generating a map of the vehicle environment on the basis of a plurality of sensors having distinct features. Some aspects of the second aim of the invention are based on the concept of using a plurality of simple and inexpensive sensors to produce a precise map of the vehicle environment over an extended area. Some aspects of the second aim of the invention are based on the concept of providing an acceleration setpoint as a function of environmental data within the context of heavy traffic. Some aspects of the second aim of the invention are based on the concept of providing a driving assistance system in the event of heavy traffic that is capable of managing circulation on a road having a plurality of traffic lanes.

BRIEF DESCRIPTION OF THE FIGURES

The invention will be better understood, and further aims, details, features and advantages thereof will become more clearly apparent, throughout the following description of several particular embodiments of the invention, which are provided solely by way of non-limiting illustrations, and with reference to the accompanying drawings, in which.

DETAILED DESCRIPTION OF EMBODIMENTS

Figure 1:
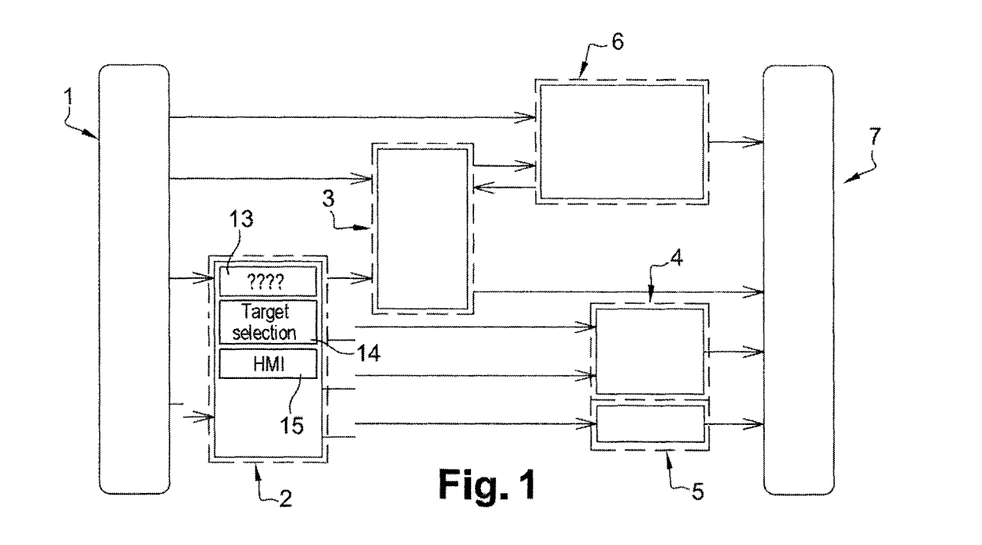
FIG. 1 is a schematic representation of a driving assistance system for a heavy traffic situation for a vehicle comprising a manual gearbox.
Figure 2:
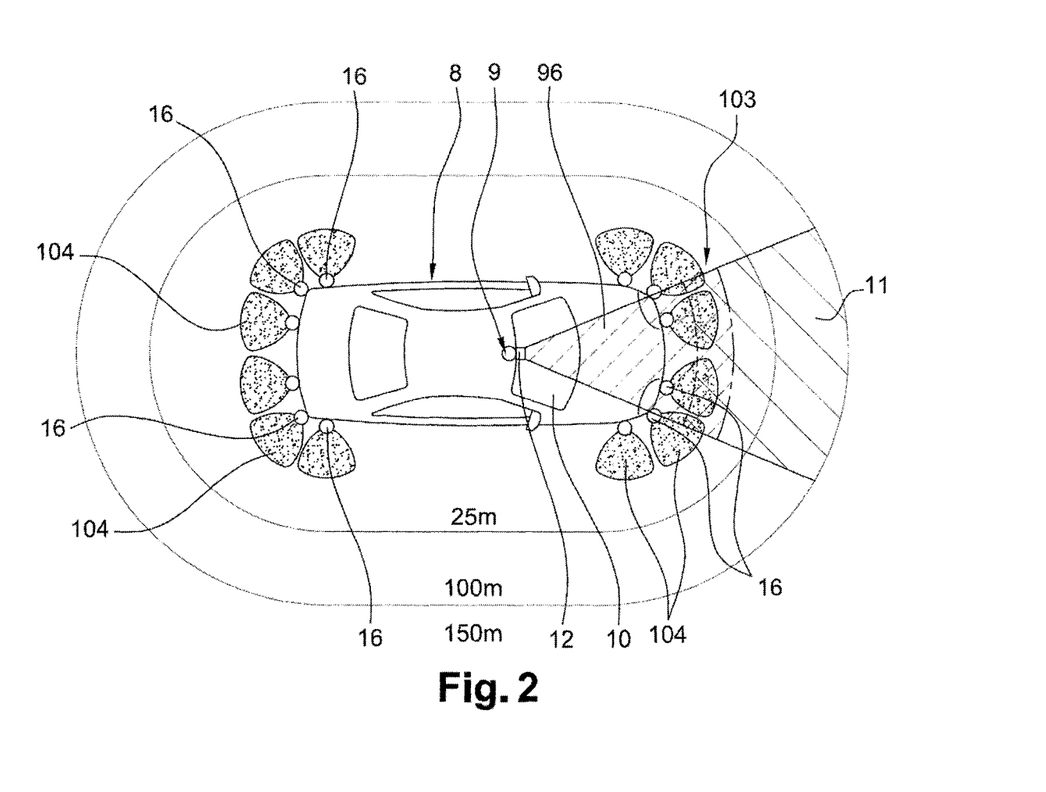
FIG. 2 is a schematic representation of a vehicle comprising a plurality of sensors for a driving assistance system for a heavy traffic situation.

The structure of a driving assistance device for a heavy traffic situation for a vehicle comprising a manual gearbox is shown with reference to FIGS. 1 and 2.

As shown in FIG. 1, a driving assistance device for a heavy traffic situation comprises a plurality of sensors 1 connected to a driving assistance module 2. This driving assistance module 2 is connected to an engine control unit 3, a braking control unit 4 and a steering control unit 5. Furthermore, the engine control unit 3 is also connected to a clutch control unit 6. Each control unit 3 to 6 is also connected to respective actuators 7. These actuators 7 are capable of configuring the various elements of the vehicle 8 as a function of instructions determined by the control units 3 to 6. Actuators are provided in order to, for example, control the engine speed as a function of an engine speed setpoint, adjust the torque that can be transferred by the clutch as a function of a clutch setpoint, adjust the position of the braking components as a function of a braking setpoint, etc. The operation of the various units 3 to 6 is described hereafter with reference to FIGS. 3 to 9.

FIG. 2 is a schematic representation of a vehicle 8 comprising a plurality of sensors 1. These sensors 1 are intended to detect the various elements of the environment of the vehicle 8 such as, for example, other motor vehicles circulating on the same traffic lane or on adjacent lanes (not shown).

These sensors 1 comprise a camera 9. This camera 9 is installed in the passenger compartment of the vehicle 8 on the front windshield 10. The camera 9 has a field of vision 11 oriented toward the front of the vehicle 8. The camera 9 allows the objects located in front of the vehicle 8 to be detected and identified. The field of vision 11 of the camera 9 has, for example, a range of 100 m over a frontal angle of approximately 50° to 55°. This camera allows dynamic objects, i.e. moving objects, to be detected in the field of vision 11, but also allows fixed objects to be detected such as, for example, road signs, stationary vehicles or even road markings. Such a camera 9 is, for example, a mono camera of the CMOS type with 1280*800 pixel resolution having a horizontal aperture field of 54° and a vertical field of 34°.

The sensors 1 also comprise a transit time sensor such as, for example, an infrared or laser obstacle sensor 12. This obstacle sensor 12 is also located on the front windshield 10 of the vehicle 8 and is oriented toward the front of the vehicle 8. This obstacle sensor 12 is, for example, an LED sensor operating on the principle of transit time sensors. Such an obstacle sensor 12 transmits a light signal and computes the time required for said signal to reach an obstacle. The obstacle sensor 12 allows objects to be detected in a field of vision 96 extending toward the front of the vehicle 8 from 0.1 m to approximately 60 meters away. This field of vision 96 extends, for example, over a horizontal angle of 45° to 60° and over a vertical angle of 7.5°. Such a transit time sensor does not have a dead area between said transit time sensor and its maximum detection range. Furthermore, such a transit time sensor operates regardless of the ambient luminosity. This transit time sensor thus allows obstacles to be detected even when they are very close to the vehicle 8.

This type of camera 9 and of obstacle sensor 12 both have the advantage of being simple and thus easy to integrate in the vehicle 8. Due to their simplicity, these elements also have the advantage of being inexpensive and thus can be installed on all types of vehicles, including entry level vehicles. Furthermore, these sensors have different detection features. Thus, a first map is generated by the camera 9 (step 98 shown in FIG. 11) and a second map is generated by the obstacle sensor 12 (step 99 shown in FIG. 11). Typically, the first map identifies the objects present in the field of vision 11 and the second map identifies the objects present in the field of vision 96 of the obstacle sensor 12.

The driving assistance module 2 comprises a fusion and detection module 13. This fusion and detection module 13 is connected to the sensors 1 in order to receive data relating to the presence of objects upstream of the vehicle 8, typically the first and second maps of the environment of the vehicle 8. The fusion and detection module 13 analyzes the data received from the sensors 1 in order to precisely define the environmental conditions of the vehicle 8.

Figure 11:
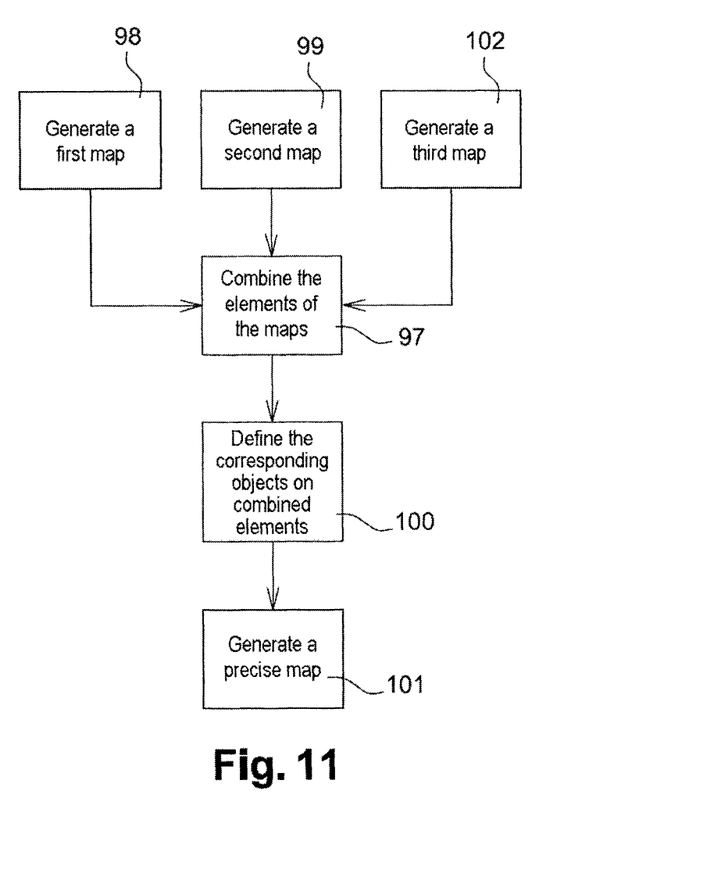
FIG. 11 is a flow chart showing the fusion of maps generated by distinct sensors.

An example of a method for fusing environment maps is described in the document entitled, "Intersection safety using Lidar and stereo vision sensors" by Olivier AYCARD, Qadeer BAIG, Siviu BOTA, Fawzi NASHASHIBI, Sergiu NEDEVSCHI, Cosmin PANTILIE, Michel PARENT, Paulo RESENDE and Trung-Dung Vu published in 2011. As shown in FIG. 11, and with reference to point VI of the aforementioned article, fusing the first map comprises a step 97 of combining objects detected in the first map and objects detected in the second map. A fusion step 100 allows the combined objects of the first map and the second map to be defined with an enhanced degree of accuracy by intersecting the positions of the combined objects identified in the first map and in the second map. A precise map is thus generated (step 101) on the basis of the elements that are only present in one of the maps and the elements that are defined during the fusion step 100. This precise map allows the objects to be identified that are present in an extended area 103 of the environment of the vehicle 8 gathering the objects detected both in the field of vision 11 of the camera 9 and in the field of vision 96 of the sensor 12. It is thus possible to obtain a precise map of the environment of the vehicle 8 listing the position of the detected objects, their fixed or dynamic status, as well as information relating to the sensors that detected this object, independently or in combination.

The fusion module 13 also allows the distance between the vehicle 8 and the various objects of the precise map to be determined. Furthermore, the fusion module 13 can compute the speed and the acceleration of the various objects of the precise map. The speed and the acceleration of each object is, for example, obtained by temporally deducing the distance between the vehicle 8 and said object. The driving assistance module 2 is thus capable of determining whether the vehicle 8 circulates in heavy traffic conditions by detecting a plurality of objects moving at a reduced speed in the environment of the vehicle 8 and by detecting obstacles. A heavy traffic situation thus can be detected in the case, for example, of a vehicle moving at a speed between 0 km/h and 30 to 40 km/h upstream of the vehicle 8 and located close to the vehicle 8.

The driving assistance module 2 further comprises a target selection module 14. This target selection module allows an object of the environment to be selected that is identified in the precise map by the fusion and detection module 13 and allows substantial information to be determined that relates to the targeted object. Thus, the target selection module allows, for example, a vehicle to be targeted that is located upstream on the traffic lane.

The driving assistance module 2 further comprises a human-machine interface 15 allowing an assisted driving mode to be activated, in which the driver does not need to control the vehicle 8. This human-machine interface 15 can be produced in numerous ways. The human-machine interface advantageously comprises a means for detecting activation conditions, an information means and an activation means (not shown). In one embodiment, the means for detecting activation conditions comprises a gearbox ratio sensor, a road grade sensor, a status sensor for the sensors that is capable of determining the correct operating status of the sensors and/or a status sensor for the engine control 3 and clutch control units that is capable of confirming the operating status of these units. In one embodiment, the information means comprise an indicator light located on the dashboard, as well as an audible transmitter. In one embodiment, the activation means comprise a dedicated button. In one embodiment, the activation means comprise a multimedia and touch sensitive graphic interface.

In an improvement, as shown in FIG. 2, the vehicle 8 further comprises a plurality of ultrasound sensors 16. Such ultrasound sensors 16 are evenly distributed over the front and rear faces of the vehicle 8. In one embodiment, the ultrasound sensors 16 are also disposed on each side of the vehicle 8 at the front and the rear of the vehicle 8. Furthermore, some ultrasound sensors 16 can be installed on the lateral front and rear faces of the vehicle 8. These ultrasound sensors 16 detect the presence of an obstacle over a short range, of approximately a few meters. These ultrasound sensors 16 are particularly useful within the context of a road having a plurality of traffic lanes in order to detect when a vehicle circulating on an adjacent traffic lane moves onto the traffic lane of the vehicle 8. As shown in FIG. 11, these ultrasound sensors generate a third map of the environment of the vehicle 8 (step 102) in an area 104 close to the vehicle (see FIG. 2). The step of combining map elements (step 97) is then advantageously completed on the first, second and third maps, further improving the precision of the precise map.

Figure 3:
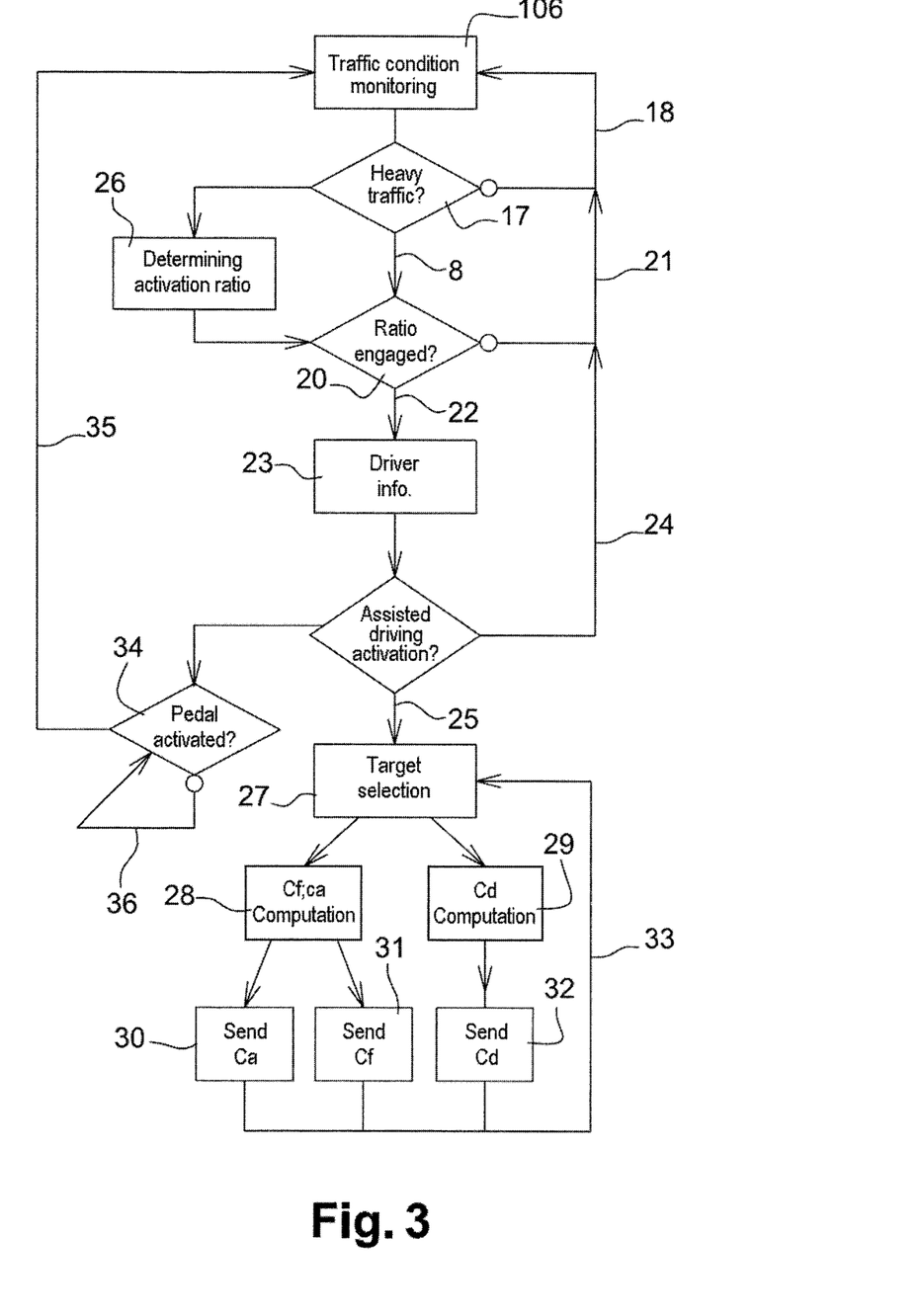
FIG. 3 is a flow chart showing the operating method of a driving assistance module for a heavy traffic situation of FIG. 1.

The general operation of the driving assistance module 2, as well as the activation of the assisted driving module as a function of predetermined conditions is described hereafter with reference to FIG. 3.

The driving assistance module 2 continuously monitors the driving conditions using sensors 1 (step 106). To this end, the driving assistance module generates a precise map of the environment of the vehicle 8 using sensors 9, 12, 16 and the fusion module 13, with this precise map identifying the objects of the environment of the vehicle 8, as well as their speed and acceleration.

The driving assistance module 2 tests (step 17) whether heavy traffic conditions are detected by analyzing the precise map generated by the fusion module 13. If the detected traffic conditions do not correspond to heavy traffic conditions (step 18), the driving assistance module 2 continues its monitoring (step 16).

If heavy traffic is detected (step 19), the driving assistance module 2 determines whether the conditions for transitioning to assisted driving are met. To this end, the driving assistance module 2 analyzes the engaged gearbox ratio (step 20). If the engaged gearbox ratio does not correspond to an assisted driving activation ratio (step 21), then the driving assistance module 2 continues monitoring the vehicle environment (step 16).

If the gearbox ratio corresponds to a ratio that allows activation of the assisted driving (step 22), then the driving assistance module notifies the driver of the possibility of activating assisted driving using an indicator light on the dashboard or an audible signal (step 23) or using the appearance or the change of status of an icon on a multimedia interface, for example. Preferably, the gearbox ratio that allows the assisted driving mode to be activated is the second gear ratio of the gearbox detected using an engaged gearbox ratio sensor. The driving assistance module then switches to standby for the activation of assisted driving by the driver. If the driver does not activate the assisted driving (step 24), the driving assistance module 2 continues to monitor the environment (step 16). If the driver activates the assisted driving (step 25), for example, by pressing a button or an icon of a dedicated touch sensitive interface, then the driving assistance module enters an assisted driving operating mode (steps 27 to 33).

In an improvement, the step (20) of testing the engaged gear further comprises determining the ratio corresponding to the ratio for activating assisted driving (step 26). To this end, the driving assistance module 2 determines the grade of the traffic lane using a grade sensor. The driving assistance module then determines that the gearbox ratio for activating assisted driving is the second gear ratio of the gearbox when the vehicle 8 circulates on a flat road or on a road having a negative grade and the first gearbox ratio when the vehicle circulates on a road having a positive grade. Such a grade sensor can also allow the moving off profile of the vehicle 8 to be determined.

In an improvement, not shown, the conditions for transitioning to assisted driving further comprise a step of confirming the operating status of the sensors and a step of confirming the operating status of the engine control unit and of the clutch control unit. In an improvement, when heavy traffic conditions are detected but the engaged gearbox ratio does not correspond to that which is required to transition to assisted driving mode, the driving assistance module 2 notifies the driver that the environmental conditions for transitioning to driving mode have been met and that they can engage the gearbox ratio required to transition to assisted driving mode.

When assisted driving is activated, the target selection module 14 determines a target to be tracked, i.e. a vehicle upstream of the vehicle 8 on the traffic lane (step 27). The driving assistance module 2 then computes an acceleration setpoint and a braking setpoint as a function of the target vehicle (step 28). Typically, the acceleration setpoint and the braking setpoint are computed as a function of the distance separating the vehicle 8 from the target vehicle, the speed of the target vehicle, as well as the acceleration of the target vehicle. Furthermore, the driving assistance module 2 computes a steering setpoint for the vehicle 8 (step 29). This computation of the steering setpoint is completed using sensors 1 detecting the direction followed by the traffic lane, for example, using recognition of lines through the image processing of the camera. Thus, the driving assistance module 2 can automatically control the lateral and longitudinal movements of the vehicle 8, for example, for speeds up to 40 km/h. In one embodiment, the driving assistance module 2 can control the longitudinal movements of the vehicle 8 as a function of the engaged gearbox ratio. For example, the driving assistance module can control longitudinal movements between 0 and 15 km/h for the first gearbox ratio and between 0 and 30 km/h for the second gearbox ratio.

The acceleration setpoint is then sent to the engine control unit 3 (step 30). Similarly, the braking setpoint is sent to the brake control unit (step 31) and the steering setpoint is sent to the steering control unit (step 32). The various units 3 to 6 then activate the corresponding actuators in order to automatically control the vehicle, i.e. without intervention from the driver, as a function of the setpoints of the driving assistance module 2 and the driving assistance module then begins a new iteration of assisted driving by returning (step 33) to the selection of a target to be tracked (step 27).

Furthermore, the driving assistance module 2 continuously tests the conditions for exiting assisted driving. In one embodiment, these conditions for exiting assisted driving comprise a test for activating a pedal of the vehicle 8 (step 34) using a position sensor for the pedals of the vehicle 8. Thus, if the driver presses the clutch pedal, the acceleration pedal or the brake pedal, this sensor detects a change of position of the corresponding pedal and deactivates the assisted driving (step 35). The driving assistance module 2 then returns to the step of monitoring the vehicle environment (step 16). Conversely, if no pedal is activated, the driving assistance module remains on standby for an instruction to exit assisted driving (step 36).

In one embodiment, not shown, the conditions for exiting assisted driving further comprise detecting a change of position of the steering wheel, detecting a change of gearbox ratio or any other action by the driver on a vehicle control element. In an improvement, the instruction to exit assisted driving also undergoes a threshold comparison step. For example, the instruction to exit assisted driving is only executed if the action of the driver on a vehicle control element exceeds a determined duration or even exceeds a certain threshold, such as a braking threshold or even an acceleration threshold. When the driver activates a vehicle control element, the driving assistance method is interrupted and, if the threshold is not exceeded, the driving assistance method is automatically reactivated as long as the driver no longer acts on the vehicle control element. By way of a variation, it is possible for only part of the driving assistance method to be deactivated as a function of the element on which the driver acts. For example, if the driver activates the brake pedal, only the longitudinal control of the vehicle is deactivated, the lateral control of the vehicle still being controlled by the driving assistance method. Conversely, if the driver activates the steering wheel, only the lateral control of the vehicle is deactivated, with the driving assistance method continuing to control the speed and the acceleration of the vehicle.

When the brake control unit receives a braking setpoint, it sends a positioning instruction from the braking unit to an ad hoc actuator in order to slow down the vehicle 8 as a function of the braking setpoint. In one embodiment, not shown, the brake control unit can be controlled by a module that is independent of the driving assistance module 2, for example, by a device of the ESP type.

Similarly, when the steering control unit receives a steering setpoint, it sends a corresponding instruction to one or more actuators allowing the steering column of the vehicle 8 to be oriented as a function of the steering setpoint.

Figure 4:
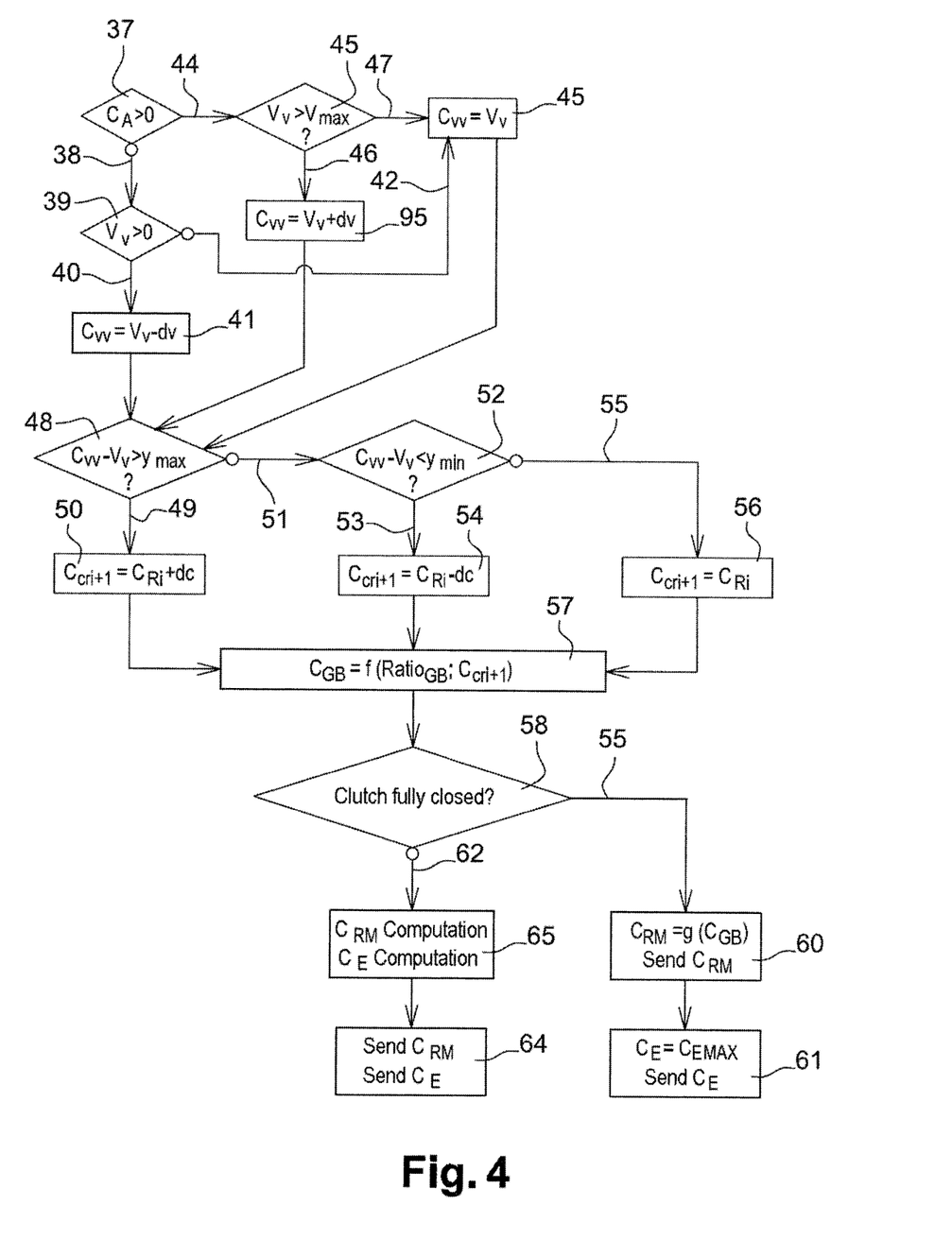
FIG. 4 is a flow chart showing the operating method of an engine control unit of FIG. 1.

The operation of the engine control unit will now be described with reference to FIG. 4.

The engine control unit 3 analyzes any acceleration setpoint that it receives from the driving assistance module 2. During a first series of computations, the engine control unit 3 defines a speed setpoint for the vehicle as a function of the received acceleration setpoint, the current speed of the vehicle, as well as the maximum speed of the vehicle for the engaged gearbox ratio.

Initially, the engine control unit tests whether the acceleration setpoint is positive (step 37), i.e. whether the acceleration setpoint corresponds to a deceleration request of the vehicle 8.

If the acceleration setpoint is negative (step 38), then the engine control unit 3 tests the current speed of the vehicle (step 39). If the current speed of the vehicle is non-zero (step 40), then the engine control unit 3 defines a vehicle speed setpoint that is equal to the current speed of the vehicle decremented by a predetermined speed value (step 41). If, on the contrary, the current speed of the vehicle is zero (step 42), then the engine control unit 3 defines a vehicle speed setpoint that is equal to the current speed of the vehicle (step 43), i.e. a zero speed setpoint.

If the acceleration setpoint is positive (step 44), i.e. the vehicle must accelerate, then the engine control unit 3 compares the current speed of the vehicle to the maximum possible speed for the engaged gearbox ratio (step 45). If the current speed of the vehicle is less than the maximum speed of the vehicle for the engaged gearbox ratio (step 46), then the engine control unit 3 defines a vehicle speed setpoint that is equal to the current speed of the vehicle incremented by a predetermined speed value (step 95). If, on the contrary, the current speed of the vehicle is greater than or equal to the maximum speed of the vehicle for the engaged gearbox ratio (step 47), then the engine control unit 3 defines a vehicle speed setpoint that is equal to the current speed of the vehicle (step 43), i.e. equal to the maximum speed of the vehicle for the engaged ratio.

After having defined a vehicle speed setpoint, the engine control unit 3 computes an engine torque setpoint to achieve the vehicle speed setpoint. To this end, the engine control unit tests whether the differential between the vehicle speed setpoint and the current speed of the vehicle is greater than a predefined positive difference (step 48). If the differential between the vehicle speed setpoint and the current speed of the vehicle is greater than the positive difference (step 49), then the engine control unit 3 defines a wheel torque setpoint that is equal to the current wheel torque incremented by a predetermined torque value (step 50). Otherwise (step 51), the engine control unit 3 tests whether the differential between the vehicle speed setpoint and the speed is less than a predefined positive difference (step 52). If the differential between the vehicle speed setpoint and the current speed of the vehicle is less than said negative difference (step 53), then the engine control unit 3 defines a wheel torque setpoint that is equal to the current wheel torque decremented by the predetermined torque value (step 54). Otherwise (step 55), i.e. the vehicle speed setpoint is substantially equal to the current speed of the vehicle, the engine control unit 3 then defines a wheel torque setpoint that is equal to the current wheel torque (step 56).

After having defined a wheel torque setpoint, the engine control unit 3 defines a gearbox input shaft torque setpoint (step 57) as a function of the wheel torque setpoint and of the engaged gearbox ratio that is equal to the wheel torque setpoint divided by the gearbox transmission ratio.

Finally, during a final series of steps, the engine control unit 3 determines an engine speed setpoint and a final torque setpoint that can be transferred by the clutch that allows the corresponding gearbox input torque to be obtained. To this end, the engine control unit 3 tests the current status of the clutch (step 58). If the clutch is in a fully closed state (step 59), then the engine control unit 3 computes an engine speed setpoint and sends this setpoint to an engine actuator (step 60). The engine actuator then regulates the engine speed according to the engine speed setpoint. Furthermore, the engine control unit 3 generates a clutch setpoint corresponding to full closure of the clutch and sends said clutch setpoint to the clutch control unit 6 (step 61). If the clutch is not fully closed (step 62), i.e. the engine shaft torque is not or is not fully transferred to the gearbox input shaft, then the engine control unit 3 computes an engine speed setpoint that is required to obtain the gearbox input shaft torque, as well as the clutch setpoint (step 63). This computation is carried out using a map stored in a memory of the engine control unit 3 (step 63). This map defines, for each gearbox input shaft torque, a minimum engine speed setpoint and a setpoint of torque that can be transferred by the corresponding clutch. The engine control unit then sends the engine speed setpoint that is to be applied to the engine actuator. At the same time, the engine control unit sends the final torque setpoint that can be transferred by the clutch to the clutch control unit 6, which setpoint is computed using the map (step 64). The clutch control determines the temporal trajectory to be followed to achieve this final transferable torque setpoint. The engine actuator regulates the engine speed as a function of the engine speed setpoint.

The engine control unit 3 performs steps 37 to 64 for each received acceleration setpoint, i.e. after having sent the engine speed setpoint and the clutch setpoint, the engine control unit returns to the step of testing the acceleration setpoint (step 37).

Thus, when the torque to be transferred by the clutch is greater than the maximum torque that can be transferred by the clutch at the engine idling speed, the engine control unit 3 controls the engine speed by keeping the clutch in a maximum transferable torque position in order to achieve the target clutch torque. Conversely, when the torque to be transferred by the clutch is less than the maximum torque that can be transferred by the clutch at the engine idling speed, typically during a stationary phase or a moving off phase of the vehicle 8, the vehicle movement is controlled by applying a constant engine speed and by regulating the physical quantity controlling the clutch torque so that the clutch transfers the torque to the gearbox input shaft that is required to obtain the target clutch torque.

Figure 5:
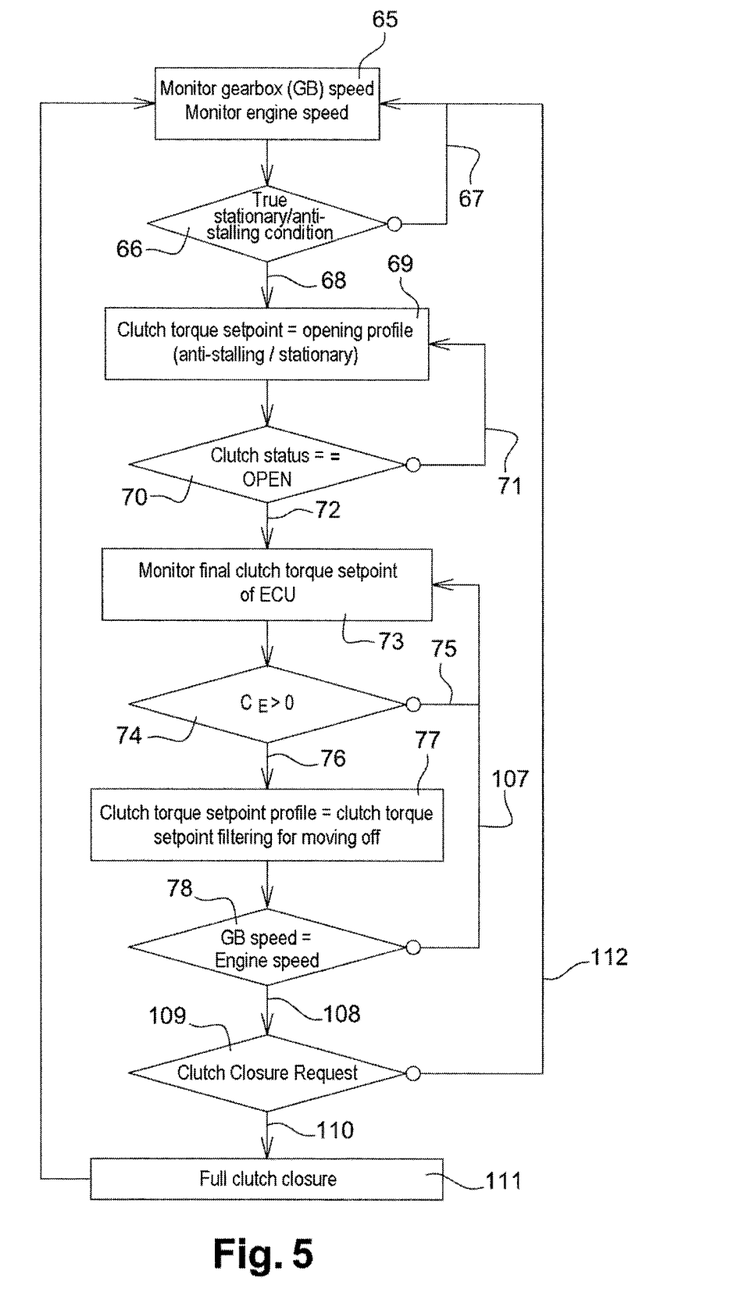
FIG. 5 is a flow chart showing the operating method of a clutch control unit of FIG. 1.

FIG. 5 is a flow chart showing the operating method of the clutch control unit of FIG. 1 from a driving situation with the clutch in the maximum transferable torque position to a stationary position of the vehicle, in which the clutch is declutched, then from the stationary position of the vehicle with the clutch declutched to a driving situation with the clutch in the maximum transferable torque position.

The clutch control unit 6 continuously monitors the speed of the drive shaft and the speed of the gearbox input shaft (step 65). These speeds are analyzed by the clutch control unit 6 in order to detect stalling or stationary conditions of the vehicle (step 66).

If the drive shaft speed and the gearbox input shaft speed do not correspond to a stationary or stalling condition (step 67), i.e. the vehicle 8 is in a driving phase whereby the movement of the vehicle 8 is controlled by regulating the engine speed via the engine control unit 3, the clutch must remain in a maximum transferable torque position. The clutch control unit 6 then remains in a maximum transferable torque position and continues monitoring the speed of the drive shaft and gearbox shaft (step 65). If, on the contrary, a stationary or stalling condition is detected (step 68), i.e. the vehicle is in a stationary phase or there is a risk of the engine stalling, then the clutch needs to be moved to a declutched position.

In order to provide the driver with the best possible comfort, the clutch control unit 6 determines a profile for progressively opening the clutch as a function of the detected stationary or stalling conditions. This progressive opening profile is adapted to the detected situation, for example, according to whether emergency braking or, on the contrary, light braking are detected, the movement of the clutch between two positions occurs in a relatively fast manner. The clutch control unit 6 then applies the progressive clutch opening profile adapted to the detected situation (step 69). The clutch control unit 6 then controls the status of the clutch in order to verify that the clutch is properly declutched (step 70). If the clutch is not declutched (step 71), the clutch control unit 6 determines a new clutch opening profile, possibly as a function of a new clutch setpoint (step 69). If, on the contrary, the clutch is fully declutched (step 72), the vehicle 8 is stationary and the clutch control unit 6 remains on standby for a clutch setpoint corresponding to the restarting of the vehicle 8 (step 73).

When the vehicle 8 is stationary and the clutch control unit 6 receives a new clutch setpoint, the clutch control unit 6 tests whether this clutch setpoint is zero (step 74).

If the clutch setpoint received by the clutch control unit 6 is zero (step 75), i.e. the vehicle 8 must remain stationary, the clutch control unit 6 remains on standby for a new clutch setpoint (step 74) and the clutch remains in the declutched position.

If, on the contrary, the clutch setpoint received by the clutch control unit 6 is non-zero (step 76), then the clutch control unit 6 determines and applies a profile for progressively engaging the clutch as a function of the clutch setpoint (step 77). After having applied the clutch opening profile (step 77), the clutch control unit verifies whether the drive shaft and the gearbox input shaft are synchronized, i.e. at the same speed (step 78).

If the drive shaft and the gearbox shaft are not synchronized (step 107), with the clutch being in a slippage position not transferring all the torque from the drive shaft to the gearbox input shaft, the clutch control unit 6 remains on standby for a new clutch setpoint (step 74). Such a case particularly occurs when the torque to be transferred via the clutch is less than the maximum torque that can be transferred by the clutch at the engine idling speed. This new clutch setpoint can be a clutch setpoint ending at a maximum transferable clutch torque position or, on the contrary, at a clutch declutched position, or even a new position with slippage.

If the drive shaft and the gearbox shaft are synchronized (step 108), with the clutch transferring all the torque from the drive shaft to the gearbox input shaft, then the clutch control unit 6 checks whether the clutch setpoint corresponds to a request to transfer the maximum transferable torque by the clutch (step 109). If the clutch setpoint is a clutch fully closed setpoint (step 110), with the vehicle 8 entering a driving phase during which the engine control unit 3 will control the movement of the vehicle 8 via the regulation of the engine speed, then the clutch control unit 6 fully closes the clutch (step 111) and returns to the step of monitoring the speed of the drive shaft and the gearbox input shaft in order to detect a stationary and/or stalling condition (step 65). If the clutch setpoint does not correspond to a clutch fully closed setpoint (step 112), then the clutch control unit 6 returns to the step of monitoring the speed of the drive shaft and the gearbox input shaft in order to detect a stationary and/or stalling condition (step 65).

In one embodiment, not shown, the clutch control unit 6 further comprises a step of continuously controlling the pedals of the vehicle. As soon as the clutch control unit 6 detects an action by the driver on one of the pedals of the vehicle, the clutch control unit transitions to an inactive mode, in which the driver controls the movement of the vehicle 8. If no action is detected on the pedals of the vehicle 8, the clutch control unit 6 activates, subject to the reception of a clutch setpoint by the engine control unit 3, monitoring of the drive shaft and of the gearbox input shaft (step 65). In a manner similar to the assisted driving method described above with reference to FIG. 3, the inactive mode of the clutch control unit 6 can be associated with the activation of other units for controlling the vehicle and that are compared to a deactivation threshold.

FIGS. 6 to 9 show the performance of the various units of the assisted driving vehicle in various situations. In these figures, curve 79 shows the distance to the target vehicle, curve 80 shows the positive acceleration request, curve 81 shows the negative acceleration request, typically the deceleration request, curve 82 shows the vehicle speed setpoint, curve 83 shows the current speed of the vehicle, curve 84 shows the engine speed, curve 85 shows the gearbox speed, curve 86 shows the engine torque setpoint and curve 87 shows the clutch setpoint.

Figure 6:
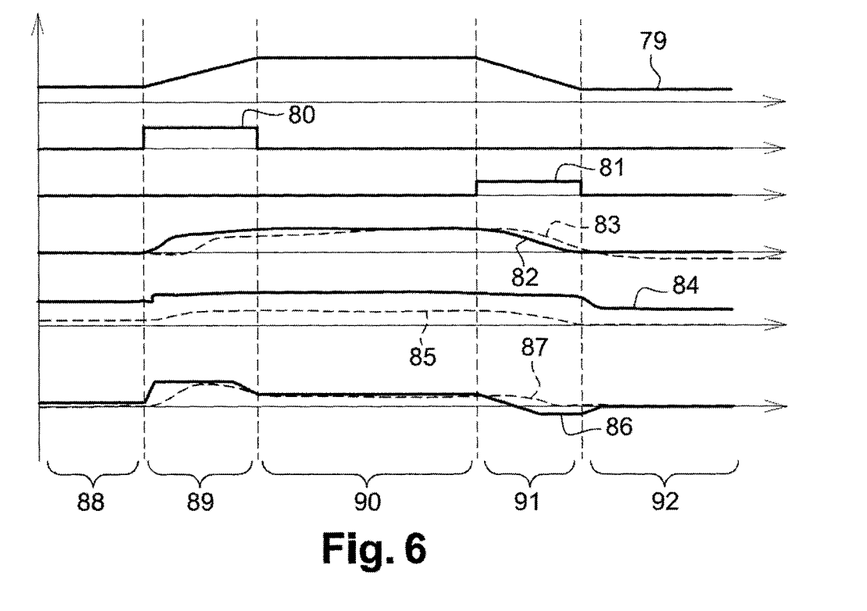
FIG. 6 shows the performance of the various units of the assisted driving vehicle successively during a start-up, in driving conditions at a speed below the idling speed for the engaged gearbox ratio and when the vehicle is stationary.
Figure 7:
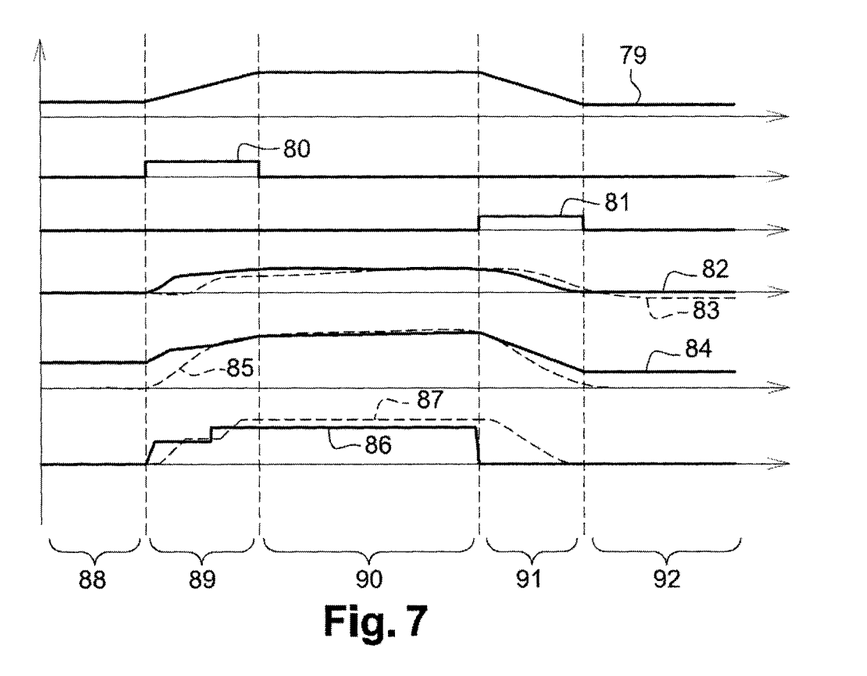
FIG. 7 shows the performance of the various units of the assisted driving vehicle successively during a start-up, in driving conditions with a fully closed clutch and when the vehicle is stationary; with a vehicle speed condition corresponding to an engine speed greater than the idling speed.
Figure 8:
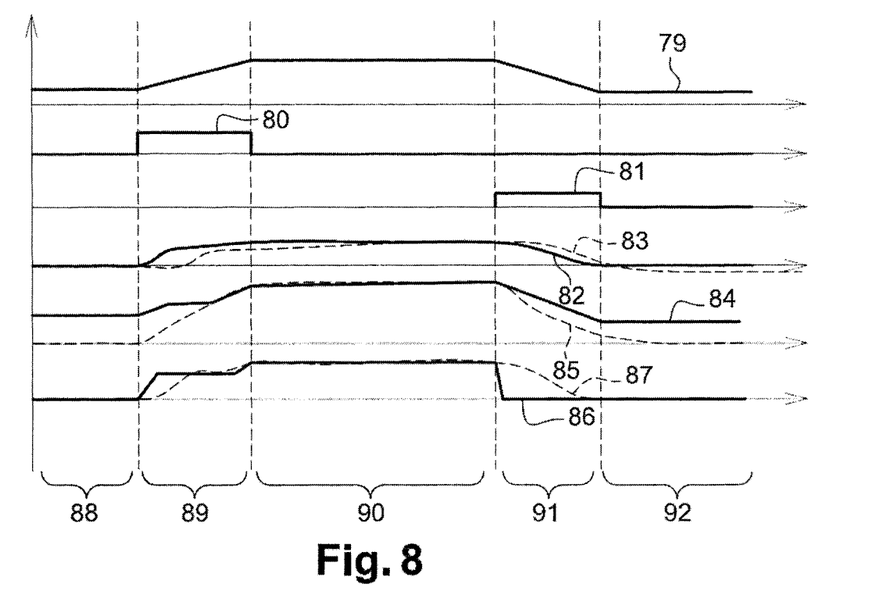
FIG. 8 shows the performance of the various units of the assisted driving vehicle successively during a start-up, in driving conditions with a clutch torque setpoint according to the engine torque setpoint and when the vehicle is stationary; with a vehicle speed condition corresponding to an engine speed greater than the idling speed.
Figure 9:
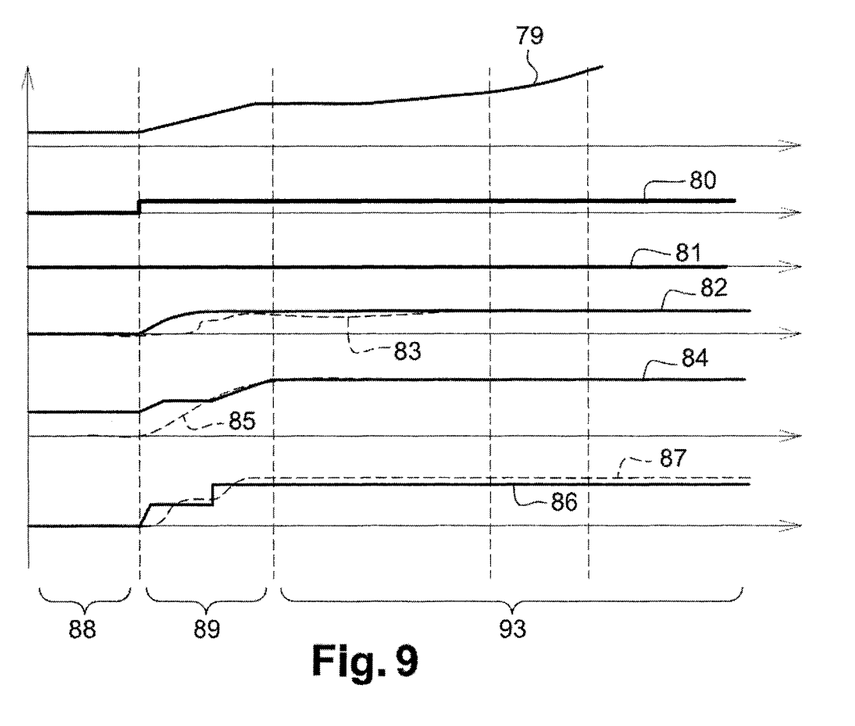
FIG. 9 shows the performance of the various units of the assisted driving vehicle successively during a start-up, then in driving conditions at a speed greater than the maximum speed of the vehicle for the engaged gearbox ratio.

Furthermore, in these figures, a first phase 88 shows a stationary phase of the vehicle, a second phase 89 corresponds to a phase of moving away from the target vehicle. In FIGS. 6 to 8, a third phase 90 corresponds to a phase of driving at a constant distance from the target vehicle, a fourth phase 91 corresponds to a phase of approaching the target vehicle and a fifth phase 92 corresponds to a stationary phase. In FIG. 9, a third phase 93 corresponds to a phase of increasingly moving away from the target vehicle.

FIG. 6 shows the performance of the various units of the assisted driving vehicle successively during a start-up, in driving conditions at a speed below the idling speed for the engaged gearbox ratio and when the vehicle is stationary. More specifically, the gearbox speed curve shows the slippage of the clutch, allowing a partial transfer of torque from the drive shaft to the gearbox input shaft until the final torque value requested by the engine control is achieved. Furthermore, the clutch setpoint curve clearly shows a progressive movement of the clutch to its declutched or maximum clutch engaged position, providing the driver with a comfortable transition between two clutch positions.

Furthermore, FIG. 6 shows a start-up from a stationary position of the vehicle. During start-up of the vehicle 8, the engine control unit 3 determines an engine torque that is required for the vehicle to move off and sends a corresponding clutch setpoint to the clutch control unit 6. This required engine torque corresponds to an engine torque that allows the inertia of the vehicle to be overcome on start-up. The clutch control unit 6 determines a torque trajectory to achieve the moving off value on the basis of a zero transferable torque corresponding to the stationary vehicle status. When the desired gearbox speed is reached, the engine control unit 3 reduces the engine torque setpoint to stabilize the vehicle speed. Consequently, the engine control unit 3 reduces the clutch setpoint at the same time in order to reduce the torque transferred by the clutch.

FIG. 7 shows the performance of the various units of the assisted driving vehicle successively during a start-up, in driving conditions with a clutch in the fully closed state and when the vehicle is stationary.

FIG. 8 shows the performance of the various units of the assisted driving vehicle successively during a start-up, in driving conditions with a clutch torque setpoint according to the engine torque setpoint and when the vehicle is stationary.

FIG. 9 shows the performance of the various units of the assisted driving vehicle successively during a start-up, then in driving conditions at a speed that is greater than the maximum speed of the vehicle for the engaged gearbox ratio.

Figure 10:
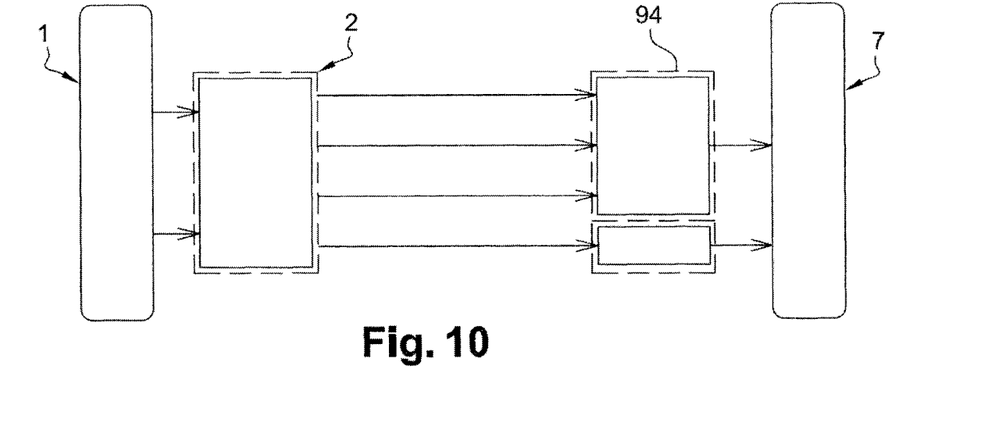
FIG. 10 is a schematic representation of a driving assistance system for a heavy traffic situation for a vehicle comprising an automatic gearbox.

As shown in FIG. 10, the driving assistance module 2 can also send an acceleration setpoint computed as above directly to an actuator control block 94 of a vehicle with an automatic gearbox. Such an actuator control block 94 can, for example, be the block managing the torque transfer between the engine and the wheels on such a vehicle with an automatic gearbox.

Even though the invention has been described in relation to a plurality of particular embodiments, it is obvious that it is by no means limited thereto and that it comprises all the technical equivalents of the means described, as well as their combinations if they fall within the scope of the invention.

The use of the verbs "comprise" or "include" and their conjugations does not exclude the presence of elements or steps other than those stated in a claim. The use of the indefinite article "a" or "an" for an element or a step does not exclude, unless otherwise stated, the presence of a plurality of such elements or steps.

In the claims, any reference sign between brackets cannot be understood to be a limitation of the claim.

The invention claimed is:

1. A driving assistance device for a motor vehicle comprising:
    a camera capable of generating a first map of the environment of the motor vehicle in a first frontal environment area of the vehicle between a first minimum distance and a first maximum distance;
    a transit time sensor capable of generating a second map of the environment of the vehicle in a second frontal environment area of the vehicle between a second minimum distance below the first minimum distance and a second maximum distance between the first minimum distance and the first maximum distance so that the first environment area of the vehicle and the second environment area of the vehicle comprise a common area of the environment of the vehicle; and
    a driving assistance module comprising:
        a fusion unit capable of generating a precise map of the frontal environment of the vehicle in a third frontal environment area of the vehicle, the precise map being generated by the fusion unit as a function of the first map and the second map, the third frontal environment area of the vehicle comprising the intersection of the first frontal environment area of the vehicle and the second frontal environment area of the vehicle;
        a movement computation unit capable of generating an acceleration setpoint of the vehicle as a function of the precise map of the vehicle environment.

2. The driving assistance device as claimed in claim 1, further comprising an ultrasound sensor capable of generating a third map of the vehicle environment in a fourth frontal environment area of the vehicle between a third minimum distance below the second minimum distance and a third maximum distance between the second minimum distance and the first maximum distance, and wherein the fusion unit of the driving assistance module is capable of generating the precise map of the frontal environment of the vehicle on the basis of the first, second and third maps, the third environment area of the vehicle comprising the intersection of the first, second and fourth frontal environment areas of the vehicle.

3. The driving assistance device as claimed in claim 1, wherein the driving assistance module further comprises a targeting unit capable of selecting a target to be tracked from among a set of obstacles of the vehicle environment identified by the precise map, and wherein the movement computation unit is capable of computing a distance separating the vehicle from the selected target and of generating the acceleration setpoint of the vehicle as a function of said computed distance separating the vehicle from the selected target.

4. The driving assistance device as claimed in claim 3, wherein the movement computation unit is capable of computing a speed and an acceleration of the selected target by deducing the distance between the vehicle and the selected target, the acceleration setpoint of the vehicle being computed as a function of the acceleration of the selected target.

5. The driving assistance device as claimed in claim 1, wherein the transit time sensor is an infrared sensor.

6. The driving assistance device as claimed in claim 1, wherein the fusion unit is capable of combining together one of the objects identified by the first map and a corresponding object from the objects identified by the second map and of determining a position in the precise map of an object corresponding to said combined objects of the first map and the second map.

7. The driving assistance device as claimed in claim 1, wherein the fusion unit is capable of generating a precise map of the vehicle environment identifying a set of mobile objects and a road marking of the vehicle environment, the movement computation unit being capable of generating a lateral movement setpoint as a function of the road marking identified by the precise map.

8. The driving assistance device as claimed in claim 1, further comprising:
    a gearbox ratio sensor, wherein the driving assistance module is capable of detecting a condition for entering a driving assistance method, the entry condition comprising a gearbox ratio condition that is met when the gearbox ratio is equal to a predetermined gearbox ratio selected from the first gear ratio and the second gear ratio of the gearbox,
    the vehicle further comprising:
    an engine control unit for:
        computing a vehicle speed setpoint as a function of the acceleration setpoint and a current speed of the vehicle;
        computing a vehicle dynamics management torque setpoint as a function of the vehicle speed setpoint, the current speed of the vehicle and a current torque of the powertrain;
        computing a gearbox input torque setpoint as a function of the engaged gearbox ratio and of the vehicle dynamics management torque setpoint;
        regulating the engine speed as a function of the gearbox input torque setpoint; and
        computing a clutch torque setpoint as a function of the gearbox input torque setpoint and of the clutch status, and
    a clutch control unit capable of regulating a physical quantity controlling the torque that is transferred by the clutch as a function of the clutch torque setpoint.

9. The driving assistance device as claimed in claim 8, further comprising a human-machine interface comprising a driver information means configured to transmit a signal for detecting conditions for entering the driving assistance method, the condition for entering the driving assistance method further comprising the activation of an activation unit by the driver.

10. The driving assistance device as claimed in claim 8, further comprising a road grade sensor, the driving assistance module being further configured to determine a road grade, the predetermined gearbox ratio being the second gear ratio in response to a negative or zero road grade and the first gear ratio in response to a positive road grade.

11. The driving assistance device as claimed in claim 8, further comprising a vehicle pedal activation sensor, and wherein the driving assistance module is further configured to:
- detect a condition for exiting the driving assistance method, the exit condition comprising a condition for activating a pedal of the vehicle, the condition for activating a pedal of the vehicle being met when a user presses on either the vehicle acceleration pedal or the vehicle clutch pedal; and
- terminate the driving assistance method when the output condition is met.

12. A driving assistance method for a motor vehicle in a heavy traffic situation comprising:
- providing a first map of the vehicle environment in a first frontal environment area of the vehicle between a first minimum distance and a first maximum distance;
- providing a second map of the vehicle environment in a second frontal environment area of the vehicle between a second minimum distance of the vehicle below the first minimum distance and a second maximum distance between the first minimum distance and the first maximum distance;
- generating a precise map of the vehicle environment as a function of the first map and the second map;
- computing an acceleration setpoint as a function of the precise map of the vehicle environment; and
- sending the computed acceleration setpoint to an engine control unit.

13. The driving assistance method as claimed in claim 12, further comprising:
- detecting a condition for entering a driving assistance method, the entry condition comprising a gearbox ratio condition, the gearbox ratio condition being met when the gearbox ratio is equal to a predetermined gearbox ratio selected from the first gear ratio and the second gear ratio of the gearbox; and
- transmitting a signal that indicates the possibility of activating the assisted driving,
- wherein the steps of computing an acceleration setpoint and of sending the acceleration setpoint are performed in response to the detection of the activation of a means for activating the assisted driving.

* * * * *